United States Patent [19]

Brown

[11] Patent Number: 4,795,054

[45] Date of Patent: Jan. 3, 1989

[54] INSERT FOR FUEL TANK FILLER CAP

[75] Inventor: William H. Brown, Menomonee Falls, Wis.

[73] Assignee: Harley-Davidson, Inc., Milwaukee, Wis.

[21] Appl. No.: 80,100

[22] Filed: Jul. 31, 1987

[51] Int. Cl.⁴ .............................................. B65D 55/16
[52] U.S. Cl. .................................... 220/254; 220/307; 220/DIG. 33; 141/392
[58] Field of Search ........................... 215/294; 217/78; 220/254, 287, 307, DIG. 33, 85 YR, 85 YS; 141/392

[56] References Cited

U.S. PATENT DOCUMENTS

| Re. 30,326 | 7/1980 | van Buren, Jr. ............... 220/307 X |
| 1,156,915 | 10/1915 | Mazoyer ............................ 215/294 |
| 2,224,385 | 12/1940 | Greenberg ..................... 220/254 X |
| 4,320,853 | 3/1982 | Moore ......................... 220/DIG. 33 |

FOREIGN PATENT DOCUMENTS 1444028  7/1976  United Kingdom ................ 220/307

Primary Examiner—William A. Cuchlinski, Jr.
Attorney, Agent, or Firm—John C. Cooper, III; C. Thomas Sylke; Fred Wiviott

[57] ABSTRACT

An insert assembly for a stationary fuel tank filler cap retainer for motor vehicles including motorcycles and the like. The insert assembly includes a hollow inwardly threaded tubular stem to be received in the bore of a tubular member of the filler cap retainer communicating with an opening in the fuel tank. The insert assembly includes a retainer spring member having outwardly extending, angularly disposed spring clips to be received by a notched stationary retainer. The clips are further formed to provide an over-center latching relationship an inwardly extending flange of the retainer upon insertion into the insert assembly the bore of a hollow retainer tube. The insert assembly includes an internal continuous thread for threadingly receiving a fuel cap having a threaded closure stem, and further includes an outwardly extending flanged portion overlying the flange of the stationary retainer tube for protection from deleterious contact with a fuel dispensing nozzle.

5 Claims, 1 Drawing Sheet

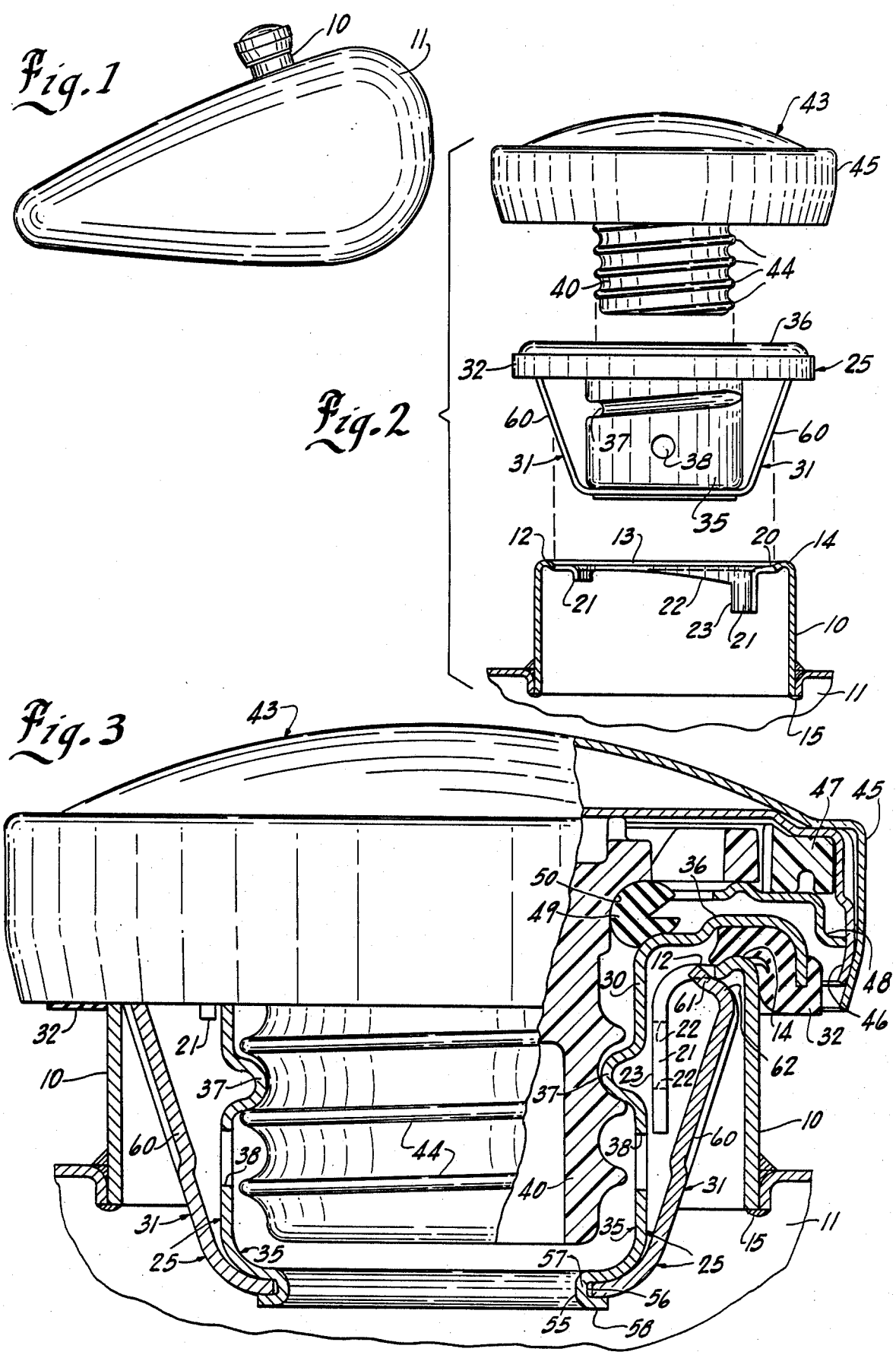

INSERT FOR FUEL TANK FILLER CAP

BACKGROUND OF THE INVENTION

1. Field of the Invention

The present invention relates generally to the art of fuel tank filler caps for motor vehicles including motorcycles, and more particularly to an insert for modifying conventional "quarter-turn" cap retainers. In its preferred embodiment, the present invention relates to an insert assembly for a conventional fuel filler cap retainer in which the insert assembly is used to modify the retainer for receipt of a removable filler cap of the threaded type.

2. Description of the Prior Art

In recent years, there has been a tendency to utilize threaded fuel tank filler caps for automobiles and other passenger car and truck applications, and in marine, industrial and similiar applications. These caps include a molded plastic, externally threaded, hollow stem received by the mating threads of a filler cap retainer made especially for cooperation with the threaded filler cap. Prior fuel tank filler caps generally provided a filler cap retainer with diametrically opposed notched areas leading into a cam surface declining inwardly of the central opening. The opening was adapted to receive cooperating locking cam follower portions on the filler cap when rotated one-quarter turn, to provide a removable closure for a fuel tank. The sealing surface of the former cap retainers was necessarily kept to a minimum and was often abraded, dented or otherwise deleteriously affected by rough handling of a gas or diesel oil supply nozzle. This has been especially true since the advent of the "self-service" stations where untrained automobile and motorcycle operators personally dispense fuel in the tanks of their motor vehicles.

With these deficiencies in mind, the present invention contemplates the use of an insert assembly to be inserted and permanently held in place within the confines of the conventional diametrically oppositely disposed notched areas of a cap retainer. This insert is further arranged with threading adapted to receive the threaded portion of a fuel tank filler cap.

OBJECTS AND SUMMARY OF THE INVENTION

It is the primary object of the present invention to provide an insert retainer assembly for a fixed tubular fuel tank retainer for a fuel filler cap, in which the insert assembly is adapted for receipt within diametrically opposed notched areas of a conventional fuel tank retainer, and being further arranged for threading engagement with a fuel tank cap having a threaded stem closing the base of the tubular retainer.

It is another object of the present invention to provide an insert assembly for a fuel cap retainer which serves to protect the sealing surface of conventional fuel tank retainers from the deleterious effects of contact with fuel supply nozzles.

It is a further object of the present invention to provide an insert for a conventional diametrically notched fuel tank retainer adapted for receipt of threaded filler cap devices.

How these and other objects of the present invention are accomplished will be described in the following detailed description of the preferred embodiment of the invention, taken in conjunction with the drawings.

Generally, however, the objects are accomplished by providing an insert assembly for a conventional fuel cap retainer, and wherein the fuel cap retainer includes diametrically opposed notched areas terminating in a declining cam surface for receiving indent portions of a conventional quarter-turn closure cap. The insert assembly includes an insert retainer, a radially expanding flange and a gasket for sealing the area between the retainer flange and the top of the fuel tank retainer when the insert assembly has been assembled in the fixed fuel tank cap retainer. The insert retainer is preferably formed of sheet steel which has been blanked, drawn and formed to provide a protruding, hollow stem portion with interior threads. This stem portion is insertable in the retainer opening, and further includes a spring clip formed with diametrically opposed spring legs projecting from a central portion having an annular opening received by the distal end of the internally threaded retainer stem. The spring legs are bent angularly upwardly and outwardly relative to the hollow insert stem to provide an outward spring bias when received by the respective notched areas of the original or conventional cap retainer. The distal end portions of the spring clip legs are preferably further formed to provide an upwardly curved detent surface for contacting an inwardly projecting upper wall surface of the fixed retainer for permanent retention therein after being seated in place by overcenter, snap action insertion therein.

Upon assembly of the insert assembly within the retainer member, the otherwise conventional retainer member will have been modified to receive a fuel tank filler cap having a threaded closure stem. The threaded filler cap devices include ratchetted override means for regulating the amount of torque needed to complete the closure seal. Other ways by which the objects of this invention are accomplished will become apparent to those skilled in the art after the specification has been read and understood.

DESCRIPTION OF THE DRAWINGS

FIG. 1 is an elevational view of a motorcycle fuel tank having a stationary filler cap retainer with the insert assembly of the present invention inserted therein.

FIG. 2 is an exploded elevational view illustrating the insert assembly of the present invention in position ready for insertion into a conventional filler cap retainer and with a threaded filler cap in ready position for insertion and enclosure within the bore of a tubular stem portion of the insert assembly.

FIG. 3 is an enlarged view partly in fragment and partly in section and illustrating components, including the insert assembly of this invention and other components completing closure of the fuel tank of FIG. 1.

DETAILED DESCRIPTION OF THE PREFERRED EMBODIMENT

Before proceeding to the detailed description of the preferred embodiment, it should be mentioned that the insert assembly of the present invention can be used in conjunction with various threaded fuel tank filler caps. That is, both vented and non-vented caps having either right hand or left hand threaded stem portions may be used with the insert of the present invention with readily apparent modification. Also, filler caps with or without a ratcheted torque limiting feature may be used. The insert assembly provides a means of converting a conventional notched retainer member for receiving quarter-turn type filler caps to a retainer modified to receive filler caps having threaded closure stem portions threadingly engagable with these insert assemblies.

With reference to the drawings, it will be observed that the filler cap retainer insert assembly is, in its preferred embodiment, readily adaptable for use in connection with a conventional fuel tank filler cap retainer 10. The conventional retainer 10 is welded 15 or otherwise secured to the top of a fuel tank 11. The illustrated fuel tank 11 is designed for use on a motorcycle, but the invention has equal application to other motor vehicles such as gasoline or diesel operated automobiles and trucks. The conventional retainer 10 (see FIGS. 2 and 3) is of generally cylindrical shape drawn and otherwise formed from a sheet metal blank of steel or other suitable material. The top wall or flange 12 extends inwardly to provide a partial enclosure and defines an entrance opening 13 for a gasoline or fuel oil nozzle (not shown). A curvate beaded rim 14 is provided for sealing and strengthening purposes.

The stationary filler cap retainer 10 is otherwise conventional and has long been manufactured to receive a quarter-turn type filler cap. A conventional filler cap (not shown) contains diametrically opposed indents received by notched detent areas 20 formed in the top wall surface or flange 12. The depending wall surface 21 defining the notched area 20 is formed along its lower edge to provide a cam surface 22 declining from the rim 14 downwardly to end in an extension forming a stop surface 23.

The retainer insert assembly of the present invention, indicated generally at 25, is preferably a three-piece assembly comprising an integrally formed tubular stem 30, spring biased indent means in the form of a spring clip 31 and an annular gasket 32.

The insert retainer stem 30 is preferably stamped and blanked from sheet metal material, such as steel or other suitable material. The blank is drawn to provide a hollow tubular filler stem 35 depending from an intergral, outwardly extending flange 36. The stem 35 is otherwise formed to provide a single, continuous or semi-interrupted internal thread 37. Vent holes 38 are also provided as necessary. The thread 37 is arranged to receive the continuous threaded portion 44 on the closure stem portion 40 of a threaded filler cap 43. The closure stem 40 is preferably molded from a plastic, resinous material approved for contact with conventional motor vehicle fuels. The stem 40 is retained in a metallic cover member 45, of polished stainless steel or other suitable material. The cover member 45 is crimped or otherwise fastened to a steel inner shell 46, with a ratchet race 47 of plastic material seated between the inner shell 46 and a retainer crimp ring 48. A sealing, gasket 49 of nitrile rubber or other elastomeric material suitable for use with fuels is retained in a shoulder 50 of the stem 40.

Referring once again to the insert assembly 25, it will be observed that the insert retainer member 30 is formed at its distal end portion 55 to form an annular opening to accept fuel dispensing nozzels and to retain the spring clip 31. That is, the spring clip 31 is provided with an annular opening 56 arranged to receive an annular portion 57 of reduced cross section, which portion is rolled back upon itself at 58 to impinge the lower end of the spring clip 31 between the rolled back portion 58 and the lowermost wall of the insert retainer member 30.

The spring clip 31 is provided with upperwardly extending, angularly disposed and diametrically opposed spring legs 60 formed with their respective uppermost end portions 61 arranged to be received in the respective notched areas 20 of the flange 12 of the conventional retainer 10. The spring clip 31 is made preferably of flat spring steel, and the spring legs 60 are formed to project outwardly, with the uppermost shoulder portion 62 being of greater dimension, measured from the central axis of the member 31, than the opening defined by the surface 13 of the retainer member 10. Continued forcing of the entire insert assembly 25 inwardly of the retainer member 10 will cause the portion 60 to "snap over" the edge of the top wall 12 to provide a permanent latching relationship between the insert assembly 30 and the retainer 10.

It will be apparent from the foregoing description and appended claims that the present invention provides a convenient insert assembly for a conventional, stationary fuel cap retainer, whereby the notched retainer, adapted to receive conventional quarter-turn type fuel caps, may be converted to receive a threaded fuel cap.

What is claimed is:

1. An insert retainer assembly for a stationary fuel filler cap retainer having a hollow filler tube with a coextensive bore, one end of said tube secured to a marginal edge portion of the entrance opening of a fuel tank and the bore of said tube communicating at one end with said fuel tank and the opposite end of the bore terminating at a radially, inwardly extending flanged tube portion having at least one notched area at its inner margin defining a detent portion therein; wherein the improvement comprises:

an insert retainer having a tubular insert stem portion defining a thru bore and depending from a radially outwardly extending insert flange, the insert stem being adapted to be received within the bore of said filler tube;

a continuous or semi-interrupted thread formed inwardly of the bore of said tubular insert stem;

spring bias indent means comprising a flat spring clip having a central portion secured to said insert stem and including at least one spring leg extending radially outwardly and angularly towards the insert flange and slidably received by the notched area of the inwardly extending insert flange, and being formed at its distal end to provide an overcenter latching engagement with the marginal undersurface defining the said notched area for retention of said insert assembly within the stationary filler cap retainer.

2. The insert assembly of claim 1, wherein there is provided a gasket fastened to said outwardly extending insert flange and providing a seal between said flange and the marginal edge portion defining the fuel tank opening.

3. The insert assembly of claim 1, wherein said spring clip includes a pair of spring legs received by respective notched areas of the inwardly extending flange of said filler tube and engageable with respective detent portions defined by the inner margin of respective ones of a pair of notched areas in the inwardly extending flange of said filler tube.

4. The insert assembly of claim 3, wherein the notched areas are positioned diametrically opposite one another to receive a pair of oppositely extending spring legs.

5. An insert retainer assembly for a stationary fuel filler cap retainer having a hollow filler tube defining a coextensive bore and secured to and communicating with the entrance opening of a fuel tank and including at the exposed end of said tube a radially, inwardly extending flange, the said flange being provided with at least one notched area communicating with the bore of the hollow tube and defining a marginal surface of a detent portion in said flange; wherein the improvement comprises:

an insert retainer having a tubular insert stem defining a thru bore and depending from a radially outwardly extending insert flange, the insert stem being adapted to be received within the bore of the retainer filler tube;

a continuous or semi-interrupted thread formed inwardly of said insert stem;

a sealing gasket fastened to said insert flange and providing a seal between the insert flange and the retainer flange, upon seating engagement of said insert stem within the bore of said filler tube;

a spring clip having a central portion secured to said insert stem and including at least one spring leg extending radially outwardly and upwardly towards the said marginal surface defining the notched area of the inwardly extending flange of said insert stem, and being formed at its distal end to provide an over-center, seating relationship with the said marginal surface for retention of said insert assembly within said stationary filler cap retainer;

whereby said insert retainer assembly provides a means for converting a conventional notched filler cap retainer for receiving a quarter-turn type filler cap into a threaded insertable retainer for receiving a filler cap having a threaded closure stem portion.

* * * * *